US008515931B1

(12) United States Patent
Amacker (10) Patent No.: US 8,515,931 B1
(45) Date of Patent: Aug. 20, 2013

(54) TECHNIQUES FOR SEARCH OPTIMIZATION

(75) Inventor: Matthew Amacker, Santa Clara, CA (US)

(73) Assignee: A9.com, Inc., Palo Alto, CA (US)

( * ) Notice: Subject to any disclaimer, the term of this patent is extended or adjusted under 35 U.S.C. 154(b) by 183 days.

(21) Appl. No.: 12/886,717

(22) Filed: Sep. 21, 2010

(51) Int. Cl.
*G06F 17/30* (2006.01)

(52) U.S. Cl.
USPC ........... 707/705; 707/706; 707/709; 707/765; 707/766; 707/767

(58) Field of Classification Search
USPC .................................. 707/769, 770
See application file for complete search history.

(56) References Cited

U.S. PATENT DOCUMENTS

| 2001/0011365 | A1* | 8/2001 | Helfman | 717/1 |
| 2007/0112759 | A1* | 5/2007 | Kulakow et al. | 707/5 |
| 2012/0011149 | A1* | 1/2012 | Zurek | 707/770 |
| 2012/0209836 | A1* | 8/2012 | Virdy | 707/724 |

* cited by examiner

*Primary Examiner* — Baoquoc N To
(74) *Attorney, Agent, or Firm* — Novak Druce Connolly Bove + Quigg LLP (57) ABSTRACT

Techniques for optimizing a search are disclosed. In one embodiment, a method for optimizing search on a Web site comprises: retrieving first search results corresponding to a first search request from a remote data store, causing the first search results to be stored in a local data store, receiving an indication that a portion of the second search results that are to be returned in response to a second search request overlaps with the first search results, causing an overlapped portion of the second search results to be retrieved from the local data store, and retrieving a remaining portion of the second search results from the remote data store. The local data store comprises a database associated with a browser, a trusted frame associated with the Web site, or a trusted script associated with the site and configured to determine the overlap of the first and second search results.

25 Claims, 9 Drawing Sheets

TECHNIQUES FOR SEARCH OPTIMIZATION

BACKGROUND

Electronic entities having a presence in an electronic environment, such as may be provided via a Web site or other such source of content, take advantage of the full capabilities of modern Web-based services to deliver a compelling user experience. For example, items offered for sale on a Web site may be divided by categories, prices, types, and other identifiers. A user may search for item(s) of interest using a search service associated with the Web site. Search results for an item may include a list of items including, for each item, price, description, images, availability and other types of data associated with the item. Once initial search results are received, a user may make further search refinements by searching for an item within a particular category (e.g., searching for a TV set under "Electronics" category), using particular search criteria (e.g., price range) or otherwise refining his or her search. Normally, different types of data associated with an item are stored in one or more data stores on the "back end" of computer systems providing services associated with a Web site. Thus, every time a search is being conducted, data associated with the items to be returned by a search service is collected from different data sources that have different capacities, response times, and other characteristics. In practice, then, an enormous amount of data gets collected, assembled, and delivered for display to a user when a search is done.

If a user decides to conduct a further search for the item by narrowing the search criteria, at least some results from the previous search will be returned in the narrowed search results. However, as in the original search, the data for the same search results would again have to be retrieved from the data sources, assembled, and delivered to the user. Thus, even if the search results for the refined search substantially overlap with the previous search results, the data for the overlapped results is collected the same way as the data for new results that were not present in the previous search results. Accordingly, additional time, effort, and resources are spent for any additional search for the item requested by a user.

DETAILED DESCRIPTION

Systems and methods are presented for optimization of various search processes, such as for search requests submitted to at least one Web resource. An example of a Web resource is a Web site that is suitable for the World Wide Web and can be accessed through a Web browser and displayed on a monitor of a computing device, where at least some content for the Web site is pulled from at least one data store against which the search request can be executed. A user may conduct a search for any item of interest (e.g., a product, video or audio content, image, and the like) on the Web resource using Web-based search services, such as, for example, search engines. One skilled in the art will appreciate that a variety of Web search services is available to a user nowadays.

In one embodiment, Web resources (such as Web pages) visited by a user may contain information for one or more items (e.g., products or services) that the user located, such as through browsing or search. An electronic entity associated with each Web page may supply a unique identifier (item identifier) that is associated with each item. A unique identifier, in one example, refers to a unique identification number or other alphanumeric string assigned to a product for identification purposes. The unique identifiers may be internal or specific to the electronic entity. Alternatively, unique identifiers of products may be supplied by vendors associated with the electronic entity, and may be the same for different electronic entities. A main characteristic of a unique identifier is that the identifier can be recognized by an electronic entity.

In one embodiment, techniques utilize unique identifiers associated with searched items as follows. When initial search results associated with a first search for an item are returned by a search service and rendered for display to a user on a computing device, the initial search results are stored in a local data store (e.g., storage associated with a browser rendered on the computing device). The initial search results may include item information associated with each item, including item identifiers. When the user submits another "refined" search request for the same item, the search service first returns item identifiers associated with the refined search results. The unique identifiers of items to be viewed in as part of the refined search results are compared with the unique identifiers stored in the local data store from the initial search results. If any matches between the unique identifiers are found, the item information associated with the matched item identifiers is retrieved from the local data store and rendered for display to the user. In this way, information already stored on the client device can be presented quickly to the user without having to wait for that information to be reloaded, even though that information could be on a different page in a different arrangement. The search service can also obtain and send information for the search results associated with the non-matched item identifiers, for which information is not already stored on the client device. These results are subsequently rendered for display to the user.

In one embodiment, the "refined" search may include a search criterion, or parameter, that may be present in the item information returned by the first search for the item. For example, the item information included in first search results may specify that the returned item(s) is (are) a "book." If the item search parameter included by the user in the search criteria for a new "refined" search is also a "book," the trusted script embedded in the browser may determine whether the first search results contain items specified as a "book." If items with the specified search parameter are found among the first search results, these items are immediately rendered to the user as a part of search results of a new "refined" search. The search service then conducts a search for items corresponding to the specified search criteria that include the search parameter (e.g., "book"), excluding the items that are already being displayed to the user. In one embodiment, the search service could maintain a list of item information stored on the client device, and only return images and other data for item identifiers for which information is not stored on the client device. Thus, there may be only one search request submitted by the client and one corresponding search executed in response to the request. In this case, the data sent back to the client may not duplicate the data stored on the client device.

Figure 1:
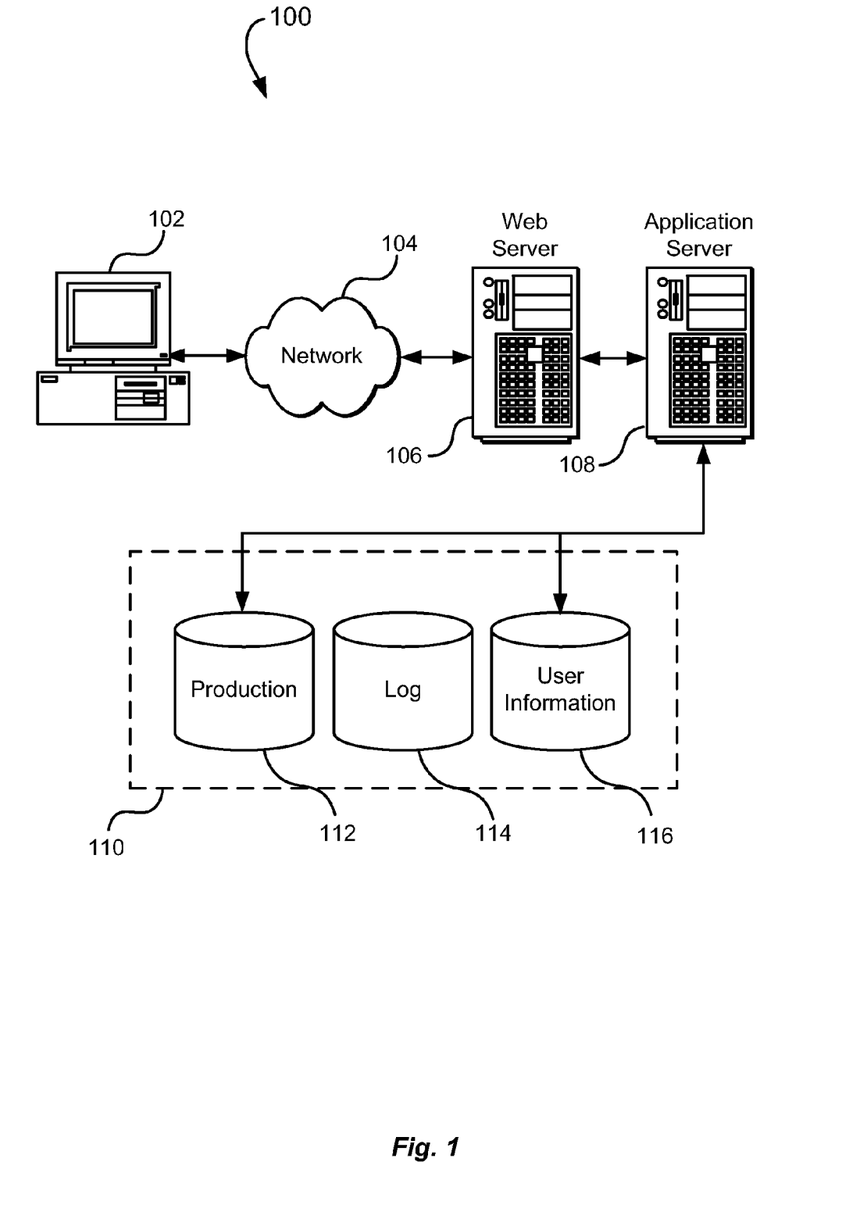
FIG. 1 illustrates an environment in which various embodiments can be implemented.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, and the environment includes a Web server 106 for receiving requests and serving content in response thereto, although for other networks, an alternative device serving a similar purpose could be used, as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein, the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to a viewer, which may be served to the viewer by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing log data 114, which can be used for reporting, generating statistics, and other such purposes. It should be understood that there can be many other aspects that may need to be stored in the data store, such as for page image information and access right information, which can be stored in any of the above-listed mechanisms as appropriate or in additional mechanisms in the data store 110. The data store 110 is operable, through logic associated therewith, to receive instructions from the application server 108 and obtain, update, or otherwise process data in response thereto. In one example, a viewer might submit a search request for a certain type of item. In this case, the data store might access the user information to verify the identity of the viewer, and can access the catalog detail information to obtain information about items of that type. The information then can be returned to the viewer, such as in a results listing on a Web page that the viewer is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limited to the scope of the disclosure.

Figure 2:
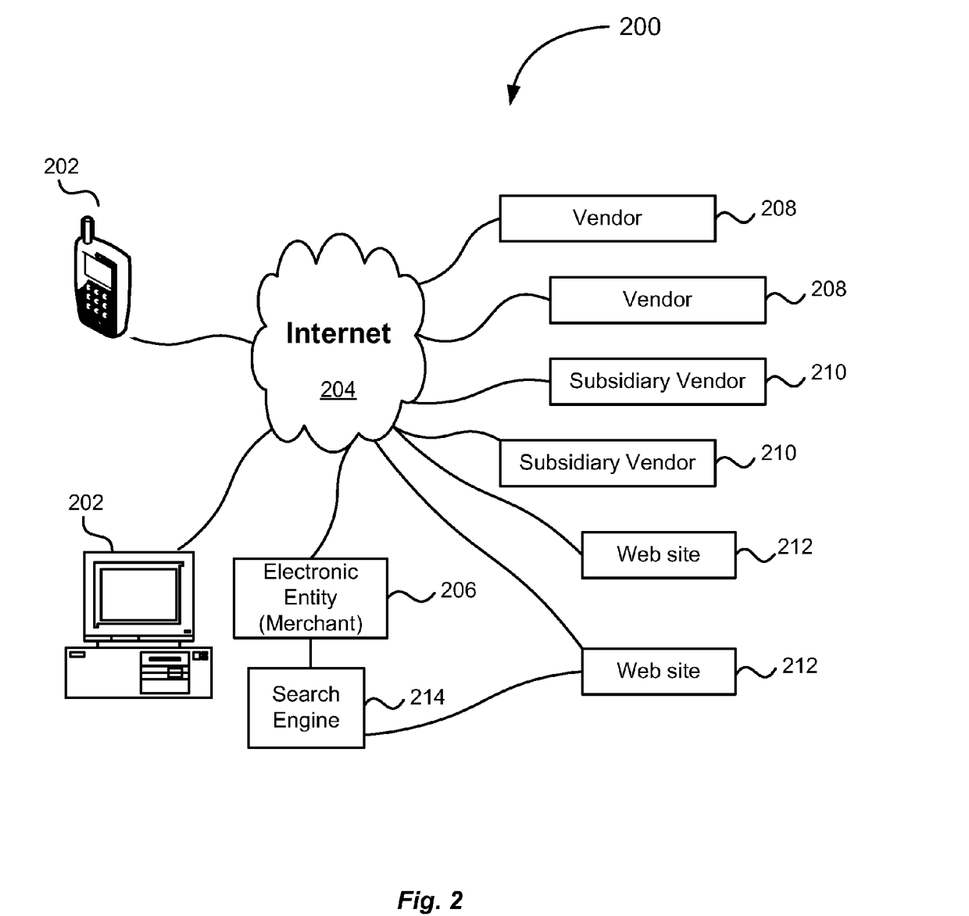
FIG. 2 illustrates an environment in which various embodiments may be practiced.

FIG. 2 shows an example environment 200 in which various embodiments may be practiced. The environment 200 may be realized utilizing one or more of the components of the environment described above in connection with FIG. 1. The environment 200, in an embodiment, includes a plurality of users operating client computing devices 202 that utilize a network such as the Internet 204 to browse content of various content providers. While the environment 200 shows the client computing devices 202 utilizing the Internet, it should be understood that other networks may be used as an alternative to or in addition to the Internet 204. Examples of other networks include mobile networks, intranets, and generally any suitable communications network. Likewise, it should be understood that client computing devices 202 may include personal computers, cell phones, handheld messaging devices, laptop computers, set-top boxes, personal data assistants, electronic book readers, and the like.

In an embodiment, users may interact through devices 202 with other entities in order to consume content, search for information or items for consumption, purchase items for consumption, and the like. As used herein, an item for consumption includes any product or item which may be consumed by a consumer. Examples include tangible items, such as consumer products. Examples also include electronic items which may be downloaded and/or streamed, including audio files, video files, and other digital content. Examples of items for consumption also include services which may be performed for and/or on behalf of consumers. As shown in FIG. 2, the environment 200 includes an electronic entity, or merchant 206. The merchant 206, for example, may operate an electronic marketplace such that the users may search, via devices 202 utilizing search services (e.g., a Web search engine 214), for items for consumption offered by the merchant 206. The merchant 206 may offer items for consumption that come from various sources, including the merchant's own sources. For example, the merchant 206 may operate systems, such as those described above in connection with FIG. 1, that enable others to utilize the systems to offer items for consumption. In short, the merchant 206 may facilitate user search and consumption of items or products offered by the merchant 206 or vendors 208 and/or 210.

For example, in an embodiment, the environment 200 includes one or more affiliate or third-party vendors 208. In an embodiment, an affiliate vendor is a merchant who offers for consumption items that are actually consumed by consumers from the merchant 206. Affiliate vendors 208 may cooperate with the merchant 206 in various ways. In one embodiment, the merchant 206 may operate an electronic marketplace, such as a Web site 212 and advertise and/or sell items for consumption that are offered by the affiliate vendor 208. Affiliate vendors 208 may utilize various systems provided by the merchant 206, such as electronic search services that enable users to search for items for consumption, and other systems.

The environment 200 may include one or more subsidiary vendors 210. In an embodiment, a subsidiary vendor is a merchant whose operations may be controlled, either completely or partially, by the merchant 206. For example, a subsidiary vendor 210 may be operated by the merchant 206, but may offer items for consumption under a different brand than the merchant 206. The subsidiary vendor 210 may offer the same or different products for consumption than the merchant 206. Alternatively, the subsidiary vendor 210 may be operated by the affiliate vendor 208, but may offer items for consumption under a different brand than the affiliate vendor 208, which may be advertised and/or offered for sale by the affiliate vendor 208 on the merchant 206's Web site 212.

In an embodiment, the environment 200 includes components and instructions for generating one or more Web sites 212. One or more of the Web sites 212 may be operated by the merchant 206, although they need not be. The Web sites 212 may offer various types of content, such as news, video, shopping for products, and the like. The Web sites 212 may offer other services, such as content or product search services, audio, social networking services, and the like. While the example environment 200 shows Web sites for the purpose of illustration, it should be understood that any type of content provider may be included in the environment 200 or variations thereof. For example, content may be provided in various ways, such as through an application interface or through other mechanisms that may not be properly classified as Web sites.

As noted, in an embodiment, the users may interact with content from the various entities, such as by searching products offered by the entities, viewing content from the entities, consuming items from the entities, and the like. In order to search for products or other content provided by the entities, the users may utilize a search service, e.g., the Web search engine 214. As one skilled in the art will appreciate, a Web search engine may be a software or a combination of software and hardware designed to search for information on the Internet. The search engine may be rendered to a client device 202 via a particular Web site or Web sites, such as the Web sites 212. The Web search engine 214 may be affiliated with the merchant 206 in a number of different ways, such as, for example, it may be designed and/or owned by the merchant 206, operated by the merchant 206, contracted by the merchant 206, be independent or autonomous from the merchant 206, and the like.

Figure 3:
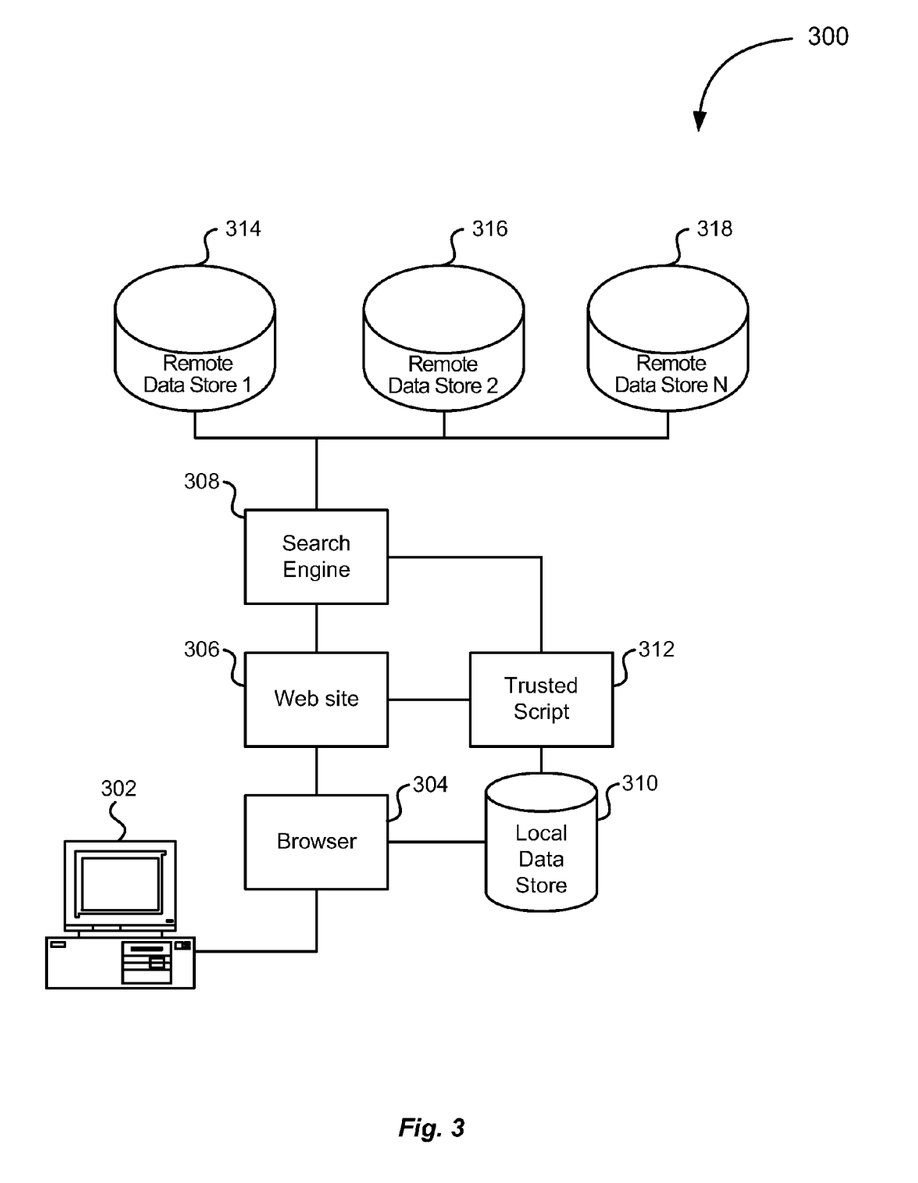
FIG. 3 illustrates a diagrammatic representation of an environment which may incorporate one or more components that are described above in connection with FIG. 1 and that may be used in accordance with various embodiments.

FIG. 3 shows an illustrative environment 300 that an electronic entity such as the merchant 206 may utilize in order to provide a user with an ability to repeatedly search for product items or other content offered by the merchant 206 and/or vendors 208 and 210 such that the user can keep track of already-viewed products or content. The environment 300 may be implemented to increase search efficiency for the users utilizing one or more client devices 202 and thus increase effectiveness for one or more of the entities 206, 208, and/or 210 shown in FIG. 2. In an embodiment, the environment 300 of FIG. 3 is utilized by an electronic entity (such as the merchant 206 shown in FIG. 2) to provide improved search experience to a user using a search service described herein. It is to be understood that the search service may comprise a number of various implementations, including, but not limited to, a software application component executed on a computing device, such as one or more Web servers. In one embodiment, the service may be offered as a part of remote computing services that together make up a cloud computing platform, offered over the Internet. The service may be configured to run in a Web server environment, such as a pure Java HTTP Web server environment.

In an embodiment, the environment 300 includes a client computing device 302 utilized by a user for interaction with electronic entities that provide content. Content may be accessed by a user operating the device 302 through a browser 304. For example, content may include products or items of various types that are to be placed on a Web site 306. The content may be stored in the remote content data store(s) 314, 316, and 318 and may be utilized by merchants, Web sites, or other entities in order to provide users an opportunity to search for, and view, items for consumption and/or other content. In an embodiment, the content data stores 314-318 store content to be provided to users, such as when users request the content by navigating to a Web site 306 operated by a merchant (e.g., merchant 206 on FIG. 2). The Web site 306 may utilize a search engine 308 in order to provide a user with the ability to search for products offered by the merchant 206 or other entities. It will be appreciated that the content may be stored in one or more data stores and that three data stores 314, 316, and 318 are shown for purely illustrative purposes, such that the number of data stores is not limited to three or any other number. The term "remote" used in conjunction with the term "data store" simply means that the data stores 314, 316, or 318 are not placed in an application operating on the computing device 302 or in the computing device itself. The remote data stores may be accessible with the search engine 308 through the Internet or any other type of computer network known in the art. The remote data stores may be associated with the electronic entity, such as above-noted merchant 206. For example, the remote data stores may be associated with a server serving the Web site 306 operated by the merchant 206.

In an embodiment, a trusted script 312, implemented in one embodiment as a JavaScript® and operating on the Web site 306 that is loaded by the browser 304, is configured to keep track of viewed items while searching items provided by the content data stores 314-318. In some embodiments, the trusted script may also be implemented as an ActionScript®, VBScript®, Java Servelet®, Flash®, JScript® or other scripting languages. Specifically, the trusted script 312, in an embodiment, may utilize information such as item identifiers of the items returned by the search engine 308 and displayed to a user as a result of a previous search in order to determine whether the current search results contain items that were previously displayed to the user. The item identifiers for the previous search, along with other information associated with each item, may be stored in a local data store 310. The trusted script 312 may be loaded on a page of the Web site 304 when a user accesses the Web site. In another embodiment, the trusted script may be implemented and is an extension (i.e., a plug-in application) to the browser and may be configured to recognize item identifiers associated with the merchant. In this embodiment, the trusted script 310 does not have to be Web site-specific; the script may be provided as a part of a browser or be installed as an extension to a browser.

The local data store 310 may be implemented in a number of different ways. For example, in an embodiment, the data store 308 may comprise a dedicated database accessible by the trusted script 312. In some Web environments, such as, for example, one provided by the HyperText Markup Language (HTML) 5, the local data store 310 may be allocated within a Web site or within a domain. For example, the local data store 310 may be embedded in the pages of the Web site 306 and may be shared with any page visited by the user on that Web site. Thus, the trusted script 312 may communicate with the local data store 310 within the browser 304 that displays the Web site 306 to a user. In another embodiment, the item identifiers and associated data may be stored in the memory of the trusted script 312 loaded in a page of the Web site 306. In yet another embodiment, the item identifiers and associated data may be stored in the memory of a trusted frame, such as an iFrame embedded in the Web site 306. Well-known methods of cross-domain communications may be utilized to exchange stored data between pages. It will be appreciated that different ways of implementing a local data store configured to store the item identifiers and related item data may be employed.

In operation, Web site 306 is displayed on computing device 302 via the browser 304. A user may conduct a search using search engine 308 in order to search items in one or more data stores 314-318. When a user sends a first search request for an item via the search engine 308, the data corresponding to their request is assembled and returned to the user via the Web site 306 rendered by browser 304 on computing device 302. The returned data may be stored in the local data store 310. As described above, the returned data may include item identifiers of returned items. When the user submits a second, "refined" search request for the item via the search engine 308, the search engine will retrieve and return item identifiers of items that are to be returned as a result of the second search. The trusted script 312 will then compare the returned item identifiers to the ones stored in the local data store 310. If the trusted script determines that there are matching item identifiers, the information associated with the matching item identifiers is retrieved from the local data store 310 and presented to the user via the Web site 306. The search engine 308 then may initiate another call to the remote data stores in order to collect data associated with the non-matching item identifiers. The returned data is subsequently rendered for display to the user via the Web site 306.

Figure 4:
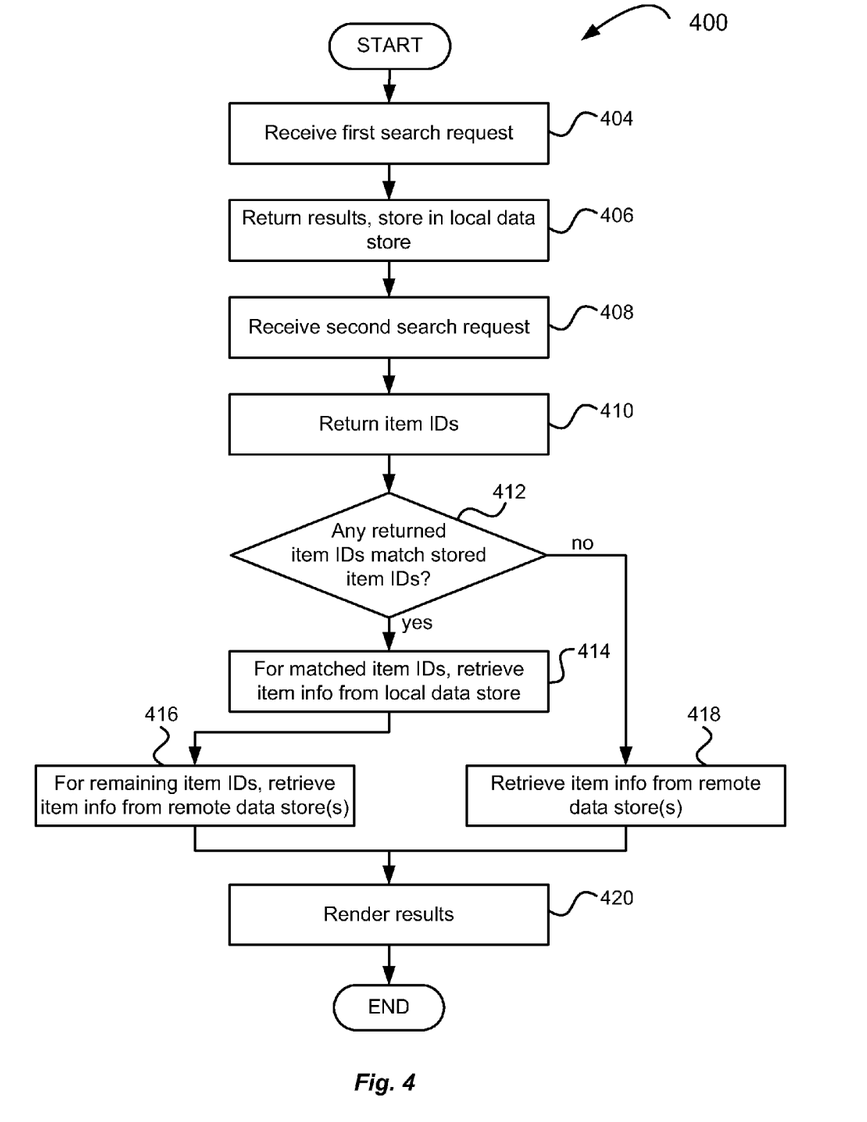
FIG. 4 illustrates a process flow diagram for operation of the search service in accordance with an embodiment.

FIG. 4 illustrates a process flow diagram operation of the search service in accordance with an embodiment. The process 400 starts at block 404 where the first search request is received. In response to the received first search request, the results are returned by the service and stored in the local data store at block 406. As described above, the returned results contain items, item description, item identifiers, and/or other such information. The associated item information may include, but is not limited to, price, availability, shipping requirements, and so on. At block 408, the second search request is received. In response to the second search request, the service returns item identifiers of the items that ought to be returned with the search request and that correspond to the search request. At determination block 412, it is determined whether any returned item identifiers match any stored item identifiers. As described above in reference to FIG. 3, this determination may be conducted by the trusted script embedded in the Web page. If the matched identifiers are found, at block 414, the items and item information corresponding to the matched item identifiers is retrieved from the local data store. Then, at block 416, item information is retrieved from the remote data stores as described above in reference to FIG. 3, for remaining item identifiers. If no matching item identifiers are found at block 412, the process moves to block 418 where the item information is retrieved from the remote data stores in accordance with the request. At block 420, the results are rendered for display to the user and the process 400 ends. In one embodiment, the results retrieved at block 414 may be first rendered for display and subsequently the results retrieved at block 416 may be added to the displayed results. In this instance, the results retrieved at block 414 may be "lifted" off the page and put in a page for new search results in "real time," providing a visual "animation" experience for the user. While the results retrieved at block 414 are being placed on the page, the rest of the results (the ones retrieved at block 416) may be loaded on the page.

Figure 5:
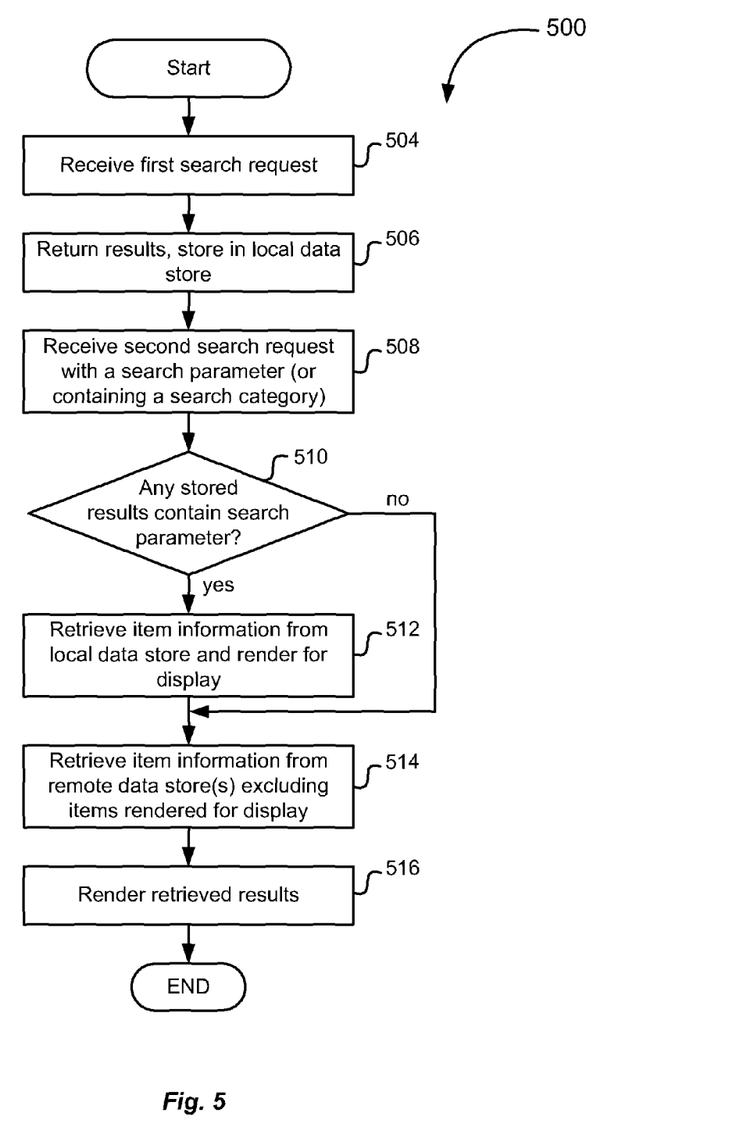
FIG. 5 illustrates a process flow diagram for operation of the search service in accordance with another embodiment.

FIG. 5 illustrates the process flow diagram for the operation of the search service in accordance with another embodiment. At block 504, a first search request for an item is received. At block 506, search results corresponding to the search request are returned and stored in the local data store. At block 508, a second search request is received. The second search request contains at least one additional search parameter or a search category that was not included in the first search request. At the determination block 510, it is determined whether any stored results from the first search contain the search parameter included in the second search request. As described above in reference to FIGS. 3 and 4, this determination may be conducted by the trusted script embedded in the Web page. If there is one or more search results that contain the search parameter, the item information that corresponds to that search parameter is retrieved from the local data store and rendered for display to the user at block 512. In one embodiment, the results may be displayed on a page in a "real time" manner as described above in reference to FIG. 4. At block 514, the item information corresponding to the second search request is retrieved from the remote data stores. If the item information corresponding to the search parameter was already retrieved and rendered at block 512, the search conducted at block 514 will exclude the already retrieved items from the search so that these results are not refetched. Finally, at block 516, the results retrieved at block 514 are rendered to the user.

Figure 6:
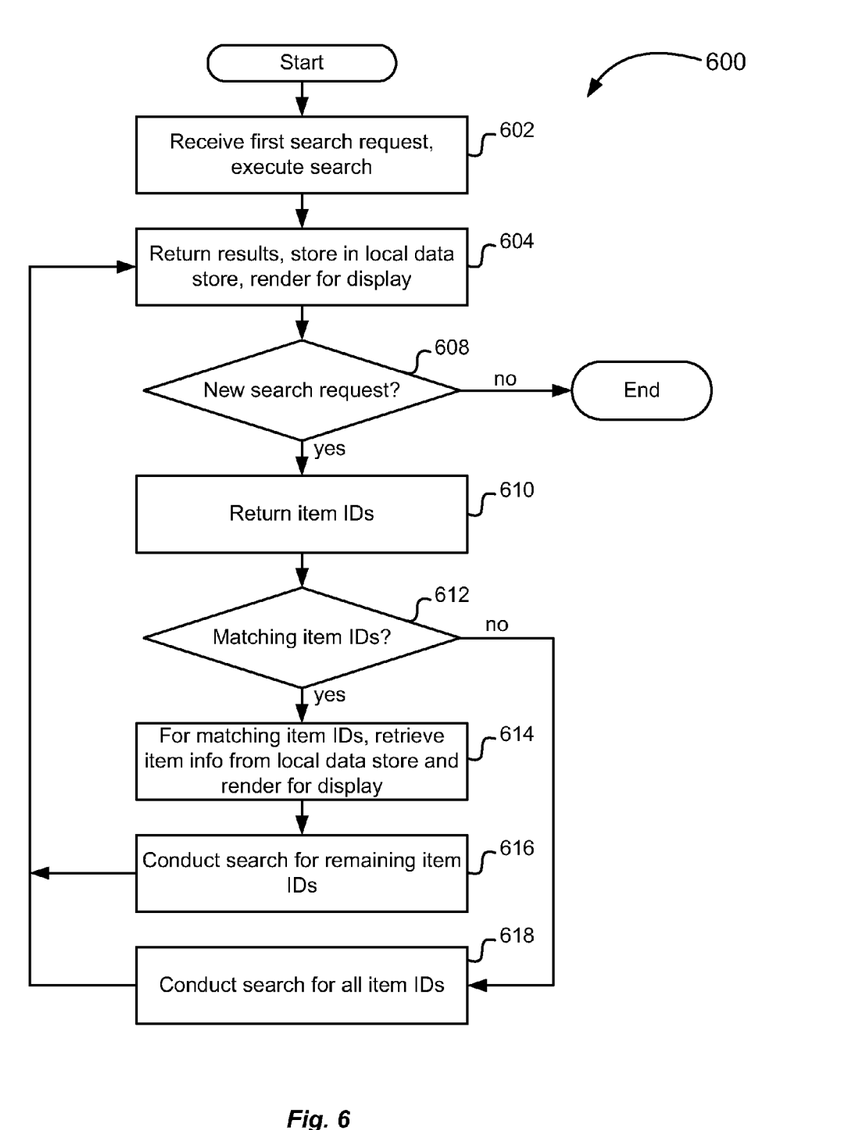
FIG. 6 illustrates a process flow diagram for operation of the search service in accordance with yet another embodiment.

It is to be understood that a user may conduct any number of searches, such as more than two searches as described above. In this case, a subsequent search may utilize the search results as a result of the previous search as will be described below in reference to FIG. 6. FIG. 6 illustrates the process flow diagram for the operation of a search service in accordance with yet another embodiment. At block 602, the first search request is received and a corresponding search is executed. At block 606, the search results are returned, stored in a local data store, and rendered for display. In block 608, it is determined whether a new search request has been submitted. If no new search request has been submitted, the process ends. If a new search request has indeed been submitted, at determination block 610, it is determined whether there are any item identifiers that match the stored item identifiers. As described above in reference to FIGS. 3, 4, and 5, this determination may be conducted by the trusted script embedded in the Web page. If it is determined that there are matching item identifiers, for matching item identifiers, the item information is retrieved from a local data store and rendered for display at block 614. For remaining item identifiers the search is conducted at block 616. If no matching item identifiers are found, the search is conducted for all item identifiers at block 618. The process then returns to block 604, where results are returned, stored in a local data store and rendered for display. Thus, the results of the previous search are cached and utilized in the next, refined search so that the results do not have to be refetched from remote data stores. Accordingly, the loaded and locally stored data may be used with each refinement search. In another embodiment, the rendering of results may be skipped and the search service may wait for the user to finish refining the search, i.e., following the search iterations that the user may be willing to conduct. In other words, rather than rendering intermediate results, the results may be returned at a point when the user has finished refining the search. Thus, the user may refine his or her search very quickly, without waiting for the entire search results to load and then continue with the search refinements.

Figure 7:
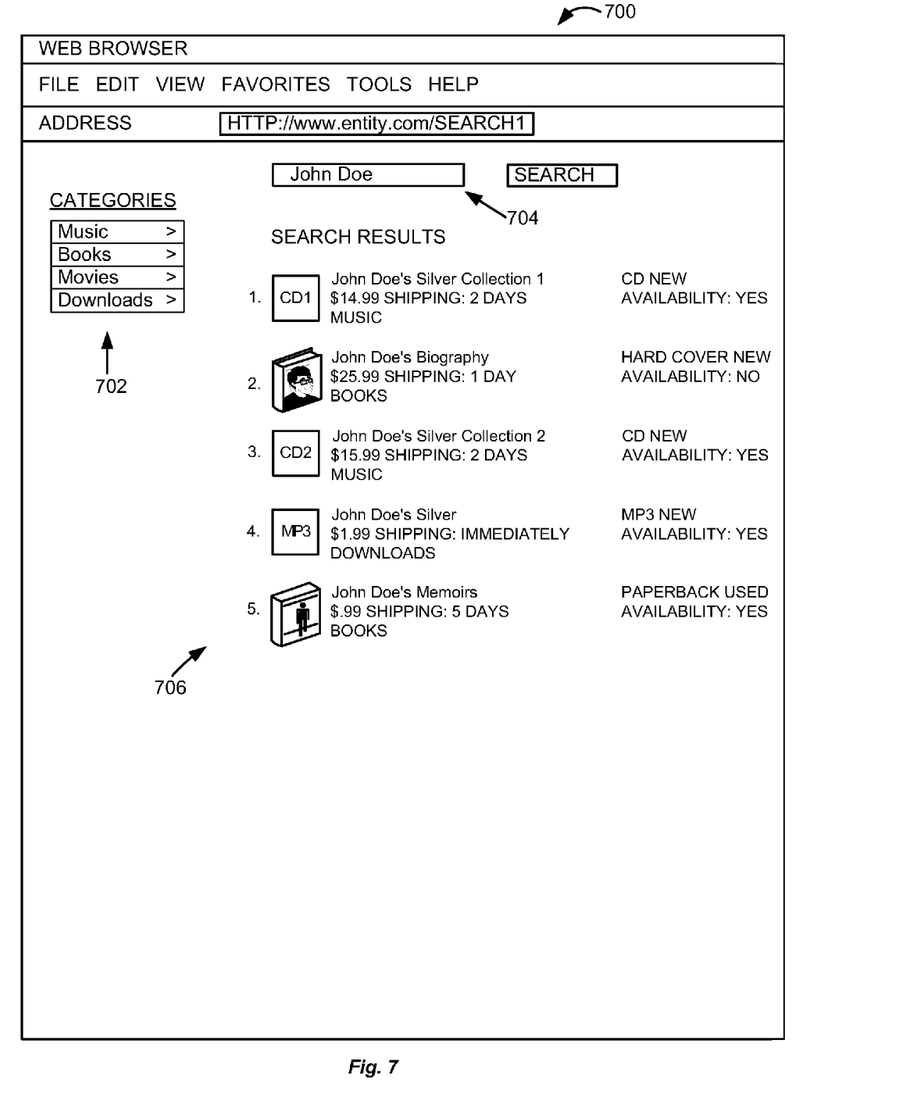
FIG. 7 illustrates an exemplary Web page showing search results in accordance with an embodiment.

FIG. 7 illustrates an exemplary Web page 700 showing search results in accordance with an embodiment. The Web page includes a number of item categories 702 as shown on the left side of the page 700, such as "any," "music," "books," "movies," and "downloads." It will be appreciated that any number of item categories of any kind may be included in the Web page. The page 700 includes the search window 704 and the search button. As shown in the window 704, a user is conducting a search for "John Doe." The search results 706 are displayed in response to the search for "John Doe." The search results, as shown in FIG. 7, may include CDs of John Doe, John Doe's biography, John Doe's MP3 available for download, John Doe's memoirs, and biography. Additional information associated with each search result (item) may be presented, such as an indication whether the item is new or used, price, shipping information, availability information and the category to which the item belongs. For example, as shown in the search results 706, item 1 belongs to category "music," item 2 belongs to category "books," and so forth. The item information may contain the item description, such as, for example, item 1, a CD, is described as "John Doe's Silver Collection 1," item 2 is "John Doe's Biography," item 3 is "John Doe's Silver Collection 2," and so on.

Figure 8:
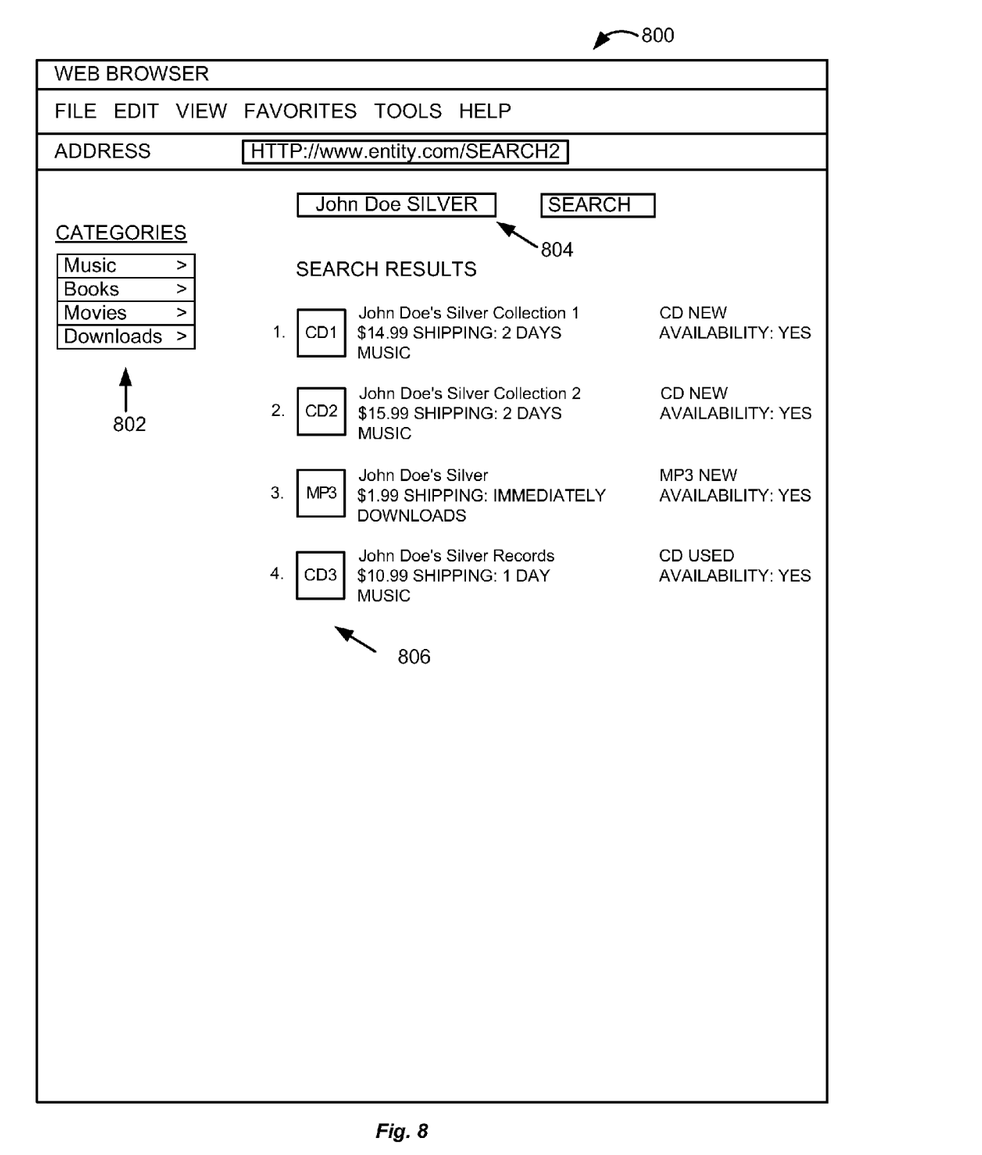
FIG. 8 illustrates an exemplary Web page showing search results in accordance with another embodiment.

FIG. 8 illustrates an exemplary Web page showing the refined search results in accordance with an embodiment. FIG. 8 includes the Web page 800 with a Web browser which renders page 800 for display to the user. As in FIG. 7, the Web page contains search results 806. As shown in the search window 804, the user refined the previous search by including the new search parameter "silver" next to the name "John Doe." As shown in the search results 806, the items 1, 3, and 4 of the previous search results illustrated in FIG. 7 are displayed as results 1, 2 and 3 in FIG. 8. These results were displayed in accordance with the process flow diagram illustrated in FIG. 5 and described above. Specifically, the locally stored results of the previous search were parsed by the trusted script described in reference to FIG. 3 to determine whether any of them contain the search parameter "silver." Accordingly, items 1, 2 and 3 were obtained by retrieving items 1, 3 and 4 of the first search containing the search parameter "silver" from the local data store and rendered for display on the Web page as illustrated in FIG. 8. Result 4 "John Doe's Silver Records" has been obtained as a result of a subsequent search of the remote data store as described in reference to FIG. 5. It will be appreciated that the search results displayed in FIG. 8 may also be obtained by following the process flow diagram illustrated in FIG. 4. In this case, the trusted script may determine that the item identifiers corresponding to items 1, 3, and 4 displayed on the Web page illustrated in FIG. 7 match the item identifiers returned for the second search. Accordingly, items 1, 3, and 4 will be retrieved from the local data store and displayed for the new search as illustrated in FIG. 8.

Figure 9:
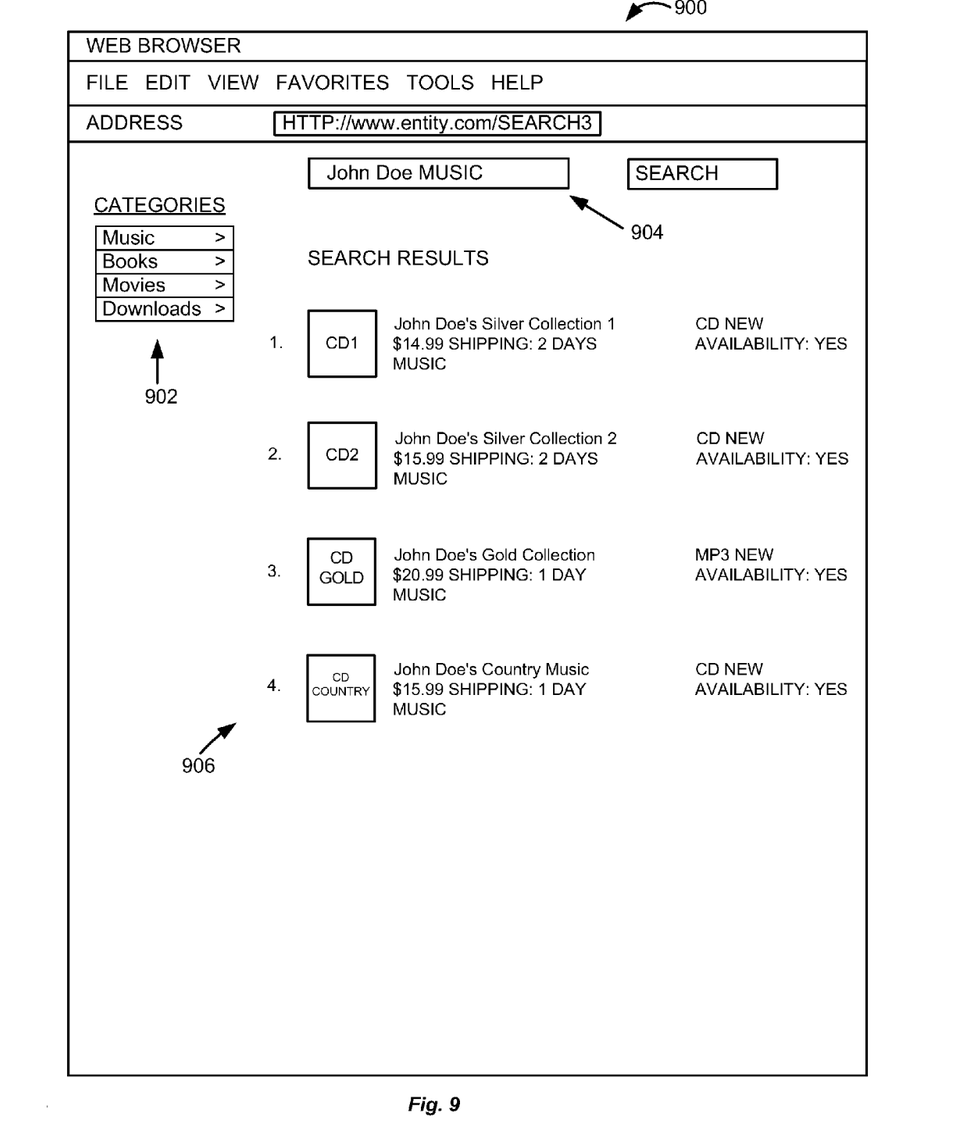
FIG. 9 illustrates an exemplary Web page showing search results in accordance with yet another embodiment.

FIG. 9 illustrates an exemplary Web page showing search results in accordance with yet another embodiment. As shown in FIG. 9, the user decided to refine the search illustrated in FIG. 7 by adding the word "music" to the name John Doe in the search window 904. It should be noted that "music" is one of the categories 702 and 902 listed on the left side of the Web pages illustrated in FIGS. 7 and 9. As described above in reference to FIG. 5, the results that include the category "music" have been lifted from the first search results illustrated in FIG. 7 and included in the search results illustrated in FIG. 9. Specifically, items 1 and 3 in FIG. 7 that belong to category "music" are now displayed as items 1 and 2 in FIG. 9. Items 3 and 4 in FIG. 9 have been obtained as a result of the further search of the remote local stores by the search process in accordance with the process flow diagram illustrated in FIG. 5 and described above.

As discussed above, the various embodiments can be implemented in a wide variety of operating environments, which in some cases can include one or more client computers, computing devices, or processing devices which can be used to operate any of a number of applications. Client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially available protocols, such as TCP/IP, OSI, FTP, UPnP, NFS, CIPS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response to requests from client devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation, those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices, such as random access memory ("RAM") or read-only memory ("ROM"), as well as removable media devices, memory cards, flash cards, and the like.

Such devices also can include a computer-readable storage media reader, a communications device (e.g., a modem, a network card (wireless or wired), an infrared communication device), and working memory as described above. The computer-readable storage media reader can be connected with, or configured to receive, a computer-readable storage medium, representing remote, local, fixed, and/or removable storage devices, as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including storage media and communication media, such as, but not limited to, volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the present disclosure as set forth in the claims.

What is claimed is:

1. A computer-implemented method for optimizing search on a Web site, comprising:
   under the control of one or more computer systems configured with executable instructions,
      receiving from a client computing device a first search request related to a collection of items, each of the items associated with item information, the item information for each of the items including at least an item identifier;
      retrieving and sending to the client computing device first search results, the first search results including a first subset of the items corresponding to the first search request;
      causing the item information associated with each item of the first subset of the items to be stored in a local data store of the client computing device;
      receiving from the client computing device a second search request, the second search request including at least one search parameter unique from the first search request;
      retrieving and sending to the client computing device second search results, the second search results including each item identifier associated respectively with one of the items of a second subset of the items corresponding to the second search request, the second subset of the items including one or more of the items of the first subset of the items;
      receiving from the client computing device a data request for the item information associated with each item in a portion of the second subset of the items, the data request including each item identifier associated respectively with one of the items in the portion of the second subset of the items, the portion of the second subset of the items comprising the items of the second subset of the items not included in the first subset of the items;
      retrieving and sending the item information associated with each item in the portion of the second subset of the items to the client computing device; and
      causing the item information associated with each item of the second subset of the items to be displayed on the client computing device, the item information associated with each item included in both the first subset of the items and the second subset of the items being retrieved from the local data store.

2. The computer-implemented method of claim 1, wherein the first search results and the item information associated with each item in the portion of the second subset of the items are retrieved from a remote data store.

3. The computer-implemented method of claim 1, further comprising:
   causing a trusted script associated with the Web site to retrieve the item information associated with each item in both the first subset of the items and the second subset of the items from the local data store.

4. A computer-implemented method for optimizing search on a Web site, comprising:
under the control of one or more computer systems configured with executable instructions,
retrieving first search results from one or more remote data stores related to a collection of items, each of the items associated with item information, the item information for each of the items including at least an item identifier, the first search results including a first subset of the items corresponding to a first search request;
causing the item information associated with each item of the first subset of the items to be stored in a local data store;
receiving a second search request, the second search request including at least one search parameter unique from the first search request;
retrieving second search results, the second search results including each item identifier associated respectively with one of the items of a second subset of the items corresponding to the second search request, the second subset of the items including one or more of the items of the first subset of the items;
receiving a data request for the item information associated with each item in a portion of the second subset of the items, the data request including each item identifier associated respectively with one of the items in the portion of the second subset of the items, the portion of the second subset of the items comprising the items of the second subset of the items not included in the first subset of the items;
retrieving the item information associated with each item in the portion of the second subset of the items from the remote data store; and
causing the item information associated with each item of the second subset of the items to be displayed, the item information associated with each item included in both the first subset of the items and the second subset of the items being retrieved from the local data store.

5. The computer-implemented method of claim 4, wherein causing to be displayed comprises:
causing the second subset of the items to be rendered for display on a page of the Web site.

6. The computer-implemented method of claim 4, further comprising:
causing a trusted script associated with a page of the Web site to determine the items of the second subset of the items not included in the first subset of the items.

7. The computer-implemented method of claim 4, wherein the local data store comprises a database associated with one of a browser that renders the Web site, a trusted frame associated with the Web site, or a trusted script associated with a page of the Web site.

8. The computer-implemented method of claim 4, wherein the remote data store comprises a database associated with a server device that serves the Web site.

9. The computer-implemented method of claim 5, wherein the items included in both the first subset of the items and the second subset of the items are rendered on the page of the Web site in a real-time mode and wherein the items of the second subset of the items not included in the first subset of the items are being retrieved while the items included in both the first subset of the items and the second subset of the items are being rendered.

10. The computer-implemented method of claim 6, wherein the trusted script complies with the ECMA-262 Edition 5 standard or a variation thereof.

11. A computer-implemented method for optimizing search on a Web site, comprising:
under the control of one or more computer systems configured with executable instructions,
receiving first search results corresponding to a first search request related to a collection of items, each of the items associated with item information, the item information for each of the items including at least an item identifier, the first search results including a first subset of the items retrieved from a remote data store; and
causing the first search results to be rendered for display;
sending a second search request, the second search request including at least one search parameter unique from the first search request;
receiving second search results corresponding to the second search request, the second search results including each item identifier associated respectively with one of the items of a second subset of the items corresponding to the second search request, the second subset of the items including one or more of the items of the first subset of the items;
sending a data request for the item information associated with each item in a portion of the second subset of the items, the data request including each item identifier associated respectively with one of the items in the portion of the second subset of the items, the portion of the second subset of the items comprising the items of the second subset of the items not included in the first subset of the items; and
receiving and causing to be rendered for display the item information associated with each item in the portion of the second subset of the items.

12. The computer-implemented method of claim 11, further comprising:
storing the item information associated with each of the first subset of the items in a local data store.

13. The computer-implemented method of claim 11, wherein the item information associated with each item in the portion of the second subset of the items is rendered for display on a first page of the Web site.

14. The computer-implemented method of claim 12, further comprising:
retrieving the item information associated with each item included in both the first subset of the items and the second subset of the items from the local data store; and
causing to be rendered for display the item information associated with each item included in both the first subset of the items and the second subset of the items.

15. A computer system for optimizing search on a Web site, comprising a processor and a memory having computer-executable instructions that, when executed on the processor, cause the processor to:
retrieve first search results from one or more remote data stores related to a collection of items, each of the items associated with item information, the item information for each of the items including at least an item identifier, the first search results including a first subset of the items corresponding to a first search request;
cause the item information associated with each item of the first subset of the items to be stored in a local data store;
receive a second search request, the second search request including at least one search parameter unique from the first search request;

retrieve second search results, the second search results including each item identifier associated respectively with one of the items of a second subset of the items corresponding to the second search request, the second subset of the items including one or more of the items of the first subset of the items;

receive a data request for the item information associated with each item in a portion of the second subset of the items, the portion of the second subset of the items comprising the items of the second subset of the items not included in the first subset of the items;

retrieve the item information associated with each item in the portion of the second subset of the items from the remote data store; and cause the item information associated with each item of the second subset of the items to be displayed, the item information associated with each item included in both the first subset of the items and the second subset of the items being retrieved from the local data store.

16. The computer system of claim 15, wherein the computer-executable instructions to cause to be displayed comprises instructions to cause the processor to:

cause the second subset of the items to be rendered for display on a page of the Web site.

17. The computer system of claim 15, wherein the computer-executable instructions further cause the processor to;

cause a trusted script associated with a page of the Web site to determine the items of the second subset of the items not included in the first subset of the items.

18. The computer system of claim 15, wherein the local data store comprises a database associated with one of a browser that renders the Web site, a trusted frame associated with the Web site, or a trusted script associated with a page of the Web site.

19. The computer system of claim 15, wherein the remote data store comprises a database associated with a server device that serves the Web site.

20. A non-transitory computer-readable storage medium having computer-executable instructions for optimizing search on a Web site stored thereon that, when executed by a computer, cause the computer to:

retrieve first search results from one or more remote data stores related to a collection of items, each of the items associated with item information, the item information for each of the items including at least an item identifier, the first search results including a first subset of the items corresponding to a first search request;

cause the item information associated with each item of the first subset of the items to be stored in a local data store;

receive second search request, the second search request including at least one search parameter unique from the first search request;

retrieve second search results, the second search results including each item identifier associated respectively with one of the items of a second subset of the items corresponding to the second search request, the second subset of the items including one or more items of the first subset of the items;

receive a data request for the item information associated with each item in a portion of the second subset of the items, the portion of the second subset of the items comprising the items of the second subset of the items not included in the first subset of the items;

retrieve the item information associated with each item in the portion of the second subset of the items; from the remote data store; and cause the item information associated with each item of the second subset of the items to be displayed, the item information associated with each item included in both the first subset of the items and the second subset of the items being retrieved from the local data store.

21. The non-transitory computer-readable storage medium of claim 20, wherein the computer-executable instructions to cause to be displayed comprise instructions to cause the computer to:

cause the second subset to be rendered for display on a page of the Web site.

22. The non-transitory computer-readable storage medium of claim 20, wherein the computer-executable instructions further cause the computer to:

cause a trusted script associated with a page of the Web site to determine the items of the second subset of the items not included in the first subset of the items.

23. The non-transitory computer-readable storage medium of claim 20, wherein the local data store comprises a database associated with one of a browser that renders the Web site, a trusted frame associated with the Web site, or a trusted script associated with a page of the Web site.

24. The non-transitory computer-readable storage medium of claim 21 wherein the items included in both the first subset of the items and the second subset of the items are rendered on the page of the Web site in a real-time mode and the items of the second subset of the items not included in the first subset of the items are being retrieved while the items included in both the first subset of the items and the second subset of the items are being rendered.

25. The non-transitory computer-readable storage medium of claim 22 wherein the trusted script complies with the ECMA-262 Edition 5 standard or a variation thereof.

* * * * *